Patented Nov. 18, 1952

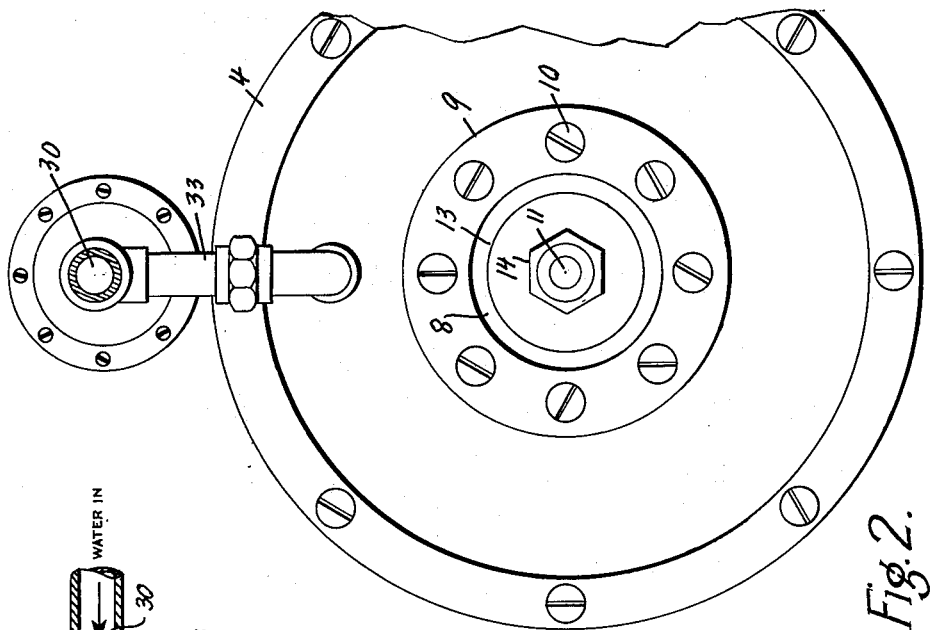
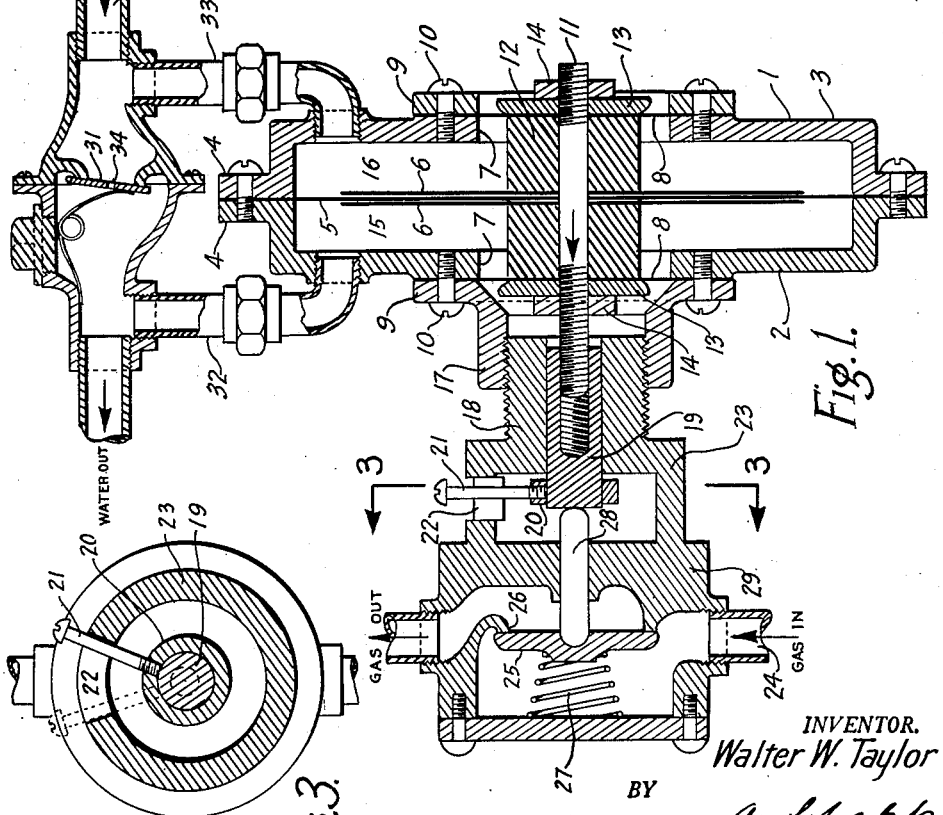

2,618,287

UNITED STATES PATENT OFFICE 2,618,287

DIFFERENTIAL PRESSURE RESPONSIVE CONTROL

Walter W. Taylor, Oakland, Calif.

Application July 27, 1948, Serial No. 40,923

4 Claims. (Cl. 137—94)

1

The present invention relates to a differential pressure responsive control for a fluid line or the like, and its principal object is to provide a control of the character described that is simple in construction, leak-proof, and that dispenses altogether with the use of packing glands.

More particularly it is proposed to use as principal control elements a housing divided into two chambers by means of a large diaphragm, and to provide two smaller diaphragms at opposite ends of the housing to form closures for the chambers, the three diaphragms being interconnected in their central portions to form a rigid unit which freely floats with respect to the housing in response to pressure differentials prevailing in the two chambers.

It is further proposed to utilize a central rod extending through the three diaphragms as a means for combining the same into a rigid unit, and to utilize a projecting portion of the rod as an actuating member for the means to be controlled.

It is further proposed in the present invention to provide suitable and easily manipulated means for adjusting the operative length of the actuating member.

It is a further object of the invention to utilize the control in combination with a fluid pressure line and to utilize a spring loaded check valve in the line for producing differential pressures on opposite sides thereof, the line being connected, on opposite sides of the check valve with the opposing chambers in the control element, thereby producing differential pressures on opposite sides of the main diaphragm.

Further objects and advantages of my invention will appear as the specification proceeds, and the novel features of my invention will be fully defined in the claims attached hereto.

The preferred form of my invention is illustrated in the accompanying drawing, in which Figure 1 shows a central section through my control, Figure 2, an end view thereof, and Figure 3, a transverse section taken along line 3—3 of Figure 1.

While I have shown only the preferred form of my invention, I wish to have it understood that various changes and modifications may be made within the scope of the claims attached hereto without departing from the spirit of the invention.

Referring to the drawing in detail, the housing 1 of my control is preferably made cylindrical in form and comprises two sections 2 and

2

3 which may be substantially identical and which are joined by means of flanges 4, with a diaphragm 5 clamped between the flanges, the diaphragm having backing plates 6 disposed upon opposite sides thereof.

The ends of the two sections of the housing are formed with openings 7 of reduced diameters and located centrally with respect to the housing, and marginal portions of the end walls have smaller diaphragms 8 clamped thereupon by means of collars 9 and screws 10.

A rod 11 extends axially through the three diaphragms, and the latter are combined into a rigid unit by means of spacing members 12 provided between the central diaphragm and the end diaphragms, washers 13 bearing upon the outer faces of the end diaphragms, and nuts 14 threaded on the rod 11 on opposite sides of the washers 13.

In this manner the rod 11, the central portions of the three diaphragms, the spacers 12 and the washers 13 form a floating unit free to move in response to pressure differentials prevailing in the two chambers 15 and 16 formed on opposite sides of the central diaphragm 5.

One of the collars 9 has a flange 17 projecting therefrom, and a gland 18 is threaded into this flange, without interfering with the free floating movement of the diaphragm assembly. One end of the rod 11 projects into this gland and has a sleeve 19 threaded thereon, the sleeve taking bearing in the gland. The sleeve may be turned with respect to the rod to adjust the operative length thereof by means of a suitable wrench which is here shown as comprising a ring 20 revolvable on the sleeve, and a set screw 21 adapted for fastening the ring upon the sleeve and projecting outwardly through a window 22 formed in an enlarged portion 23 of the gland. For adjusting the sleeve, the screw 21 is tightened upon the same and then turned to the extent of the circumferential length of the window 22. If this adjustment is not enough the screw is loosened and turned back to the opposite end of the window whereupon it is tightened again for a second turning movement.

By way of example I show the control of my present invention as being used in connection with a gas line indicated at 24 and controlled by a valve 25 bearing upon a valve seat 26, and normally closed by means of a spring 27. The valve 25 has a plunger 28 slidable in the end 29 of the gland 18, which may be made an integral part of the valve structure. When the valve is seated the plunger 28 may be in contact with the end of the sleeve 19 if the valve is to respond immediately to any floating movement of the diaphragm assembly. If delayed movement is desired the sleeve 19 may be screwed back in the manner previously described.

It is apparent that the plunger 28 may be used as control element for any other suitable device such as a micro-switch or any other agency to be controlled.

My control is intended for operation by means of a water line 30 provided with a spring loaded check valve 31 which creates a slight differential in pressure on opposite sides when the water line is opened. The differential in pressure need not be very pronounced and should preferably be about 3 pounds. The water line is connected, on opposite sides of the check valve, to the two chambers 15 and 16 of the control respectively by means of branch pipes 32 and 33. A small bleeder hole 34 is provided in the check valve to allow pressures to be equalized when the water line is closed and also to accommodate for possible leaks in the power portion of the water line.

In use, if the water line is opened, by means of a suitable faucet not shown, pressure differentials will develop on opposite sides of the check valve and will be communicated to the chambers 15 and 16. The pressures on the two outer small diaphragms will substantially balance each other except for a slight differential in pressure, but the large diaphragm 5 will respond to the pressure differential and will cause the central sections of all three diaphragms to move toward the left for advancing the rod 11, the sleeve 19 and the plunger 28 so as to open the valve 26. If delayed action is desired the sleeve 19 may be screwed inward to a desired distance.

It will be noted that the diaphragms form a complete closure for the two chambers 15 and 16, that no packing glands are employed in the structure, and that the three diaphragms move as a unit so as to eliminate any chance of leaking.

Any delayed action in the opening of the valve by adjustment of the operative length of the rod results in a decrease in the valve opening and the latter may therefore be accurately adjusted for a desired flow of gas by manipulation of the screw 21.

I claim:

1. In combination, a fluid line having a rigid valve housing therein, with a valve seat in the housing, a valve normally urged upon the seat and a plunger slidable in the housing wall and operable for lifting the valve, diaphragm-operated means active on the plunger for operating the valve a second fluid line having a spring-pressed valve therein for producing pressure differentials on opposite sides of the valve when a fluid is forced through the second line, and means subjecting opposite sides of the diaphragm to the differential pressures for opening the first valve when a fluid is passed through the second line, the first valve housing having a gland formed integral therewith coaxial with the plunger and the diaphragm-operated means including a housing for the diaphragm having a flange threaded upon the gland, a rod secured upon the diaphragm and a sleeve threaded upon the rod and slidable in the gland so as to bear upon the plunger.

2. A combination as defined in claim 1, in which the gland is spaced from the first valve housing and the sleeve has means operable in said space for turning the sleeve and for adjusting the operative length of the sleeve and the rod.

3. In combination, a fluid line having a rigid valve housing therein, with a valve seat in the housing, a valve normally urged upon the seat and a plunger slidable in the housing wall and operable for lifting the valve, diaphragm-operated means active on the plunger for operating the valve, a second fluid line having a spring-pressed valve therein for producing pressure differentials on opposite sides of the valve when a fluid is forced through the second line, and means subjecting opposite sides of the diaphragm to the differential pressures for opening the first valve when a fluid is passed through the second line, the second valve having an orifice therein permitting the pressures on opposite sides of the valve to equalize when fluid flow through the second valve ceases and to remain equalized in case of slight leaks in the line below the valve, and the first valve housing having a gland formed integral therewith coaxial with the plunger and the diaphragm-operated means including a housing for the diaphragm having a flange threaded upon the gland, a rod secured upon the diaphragm and a sleeve threaded upon the rod and slidable in the gland so as to bear upon the plunger.

4. A combination as defined in claim 3, in which the gland is spaced from the first valve housing and the sleeve has means operable in said space for turning the sleeve and for adjusting the operative length of the sleeve and the rod.

WALTER W. TAYLOR.

REFERENCES CITED

The following references are of record in the file of this patent:

UNITED STATES PATENTS

| Number | Name | Date |
|---|---|---|
| 1,567,435 | Gauger | Dec. 29, 1925 |
| 1,992,343 | Ahnstrom | Feb. 26, 1935 |
| 2,057,624 | Burkhart | Oct. 13, 1936 |
| 2,146,176 | Donaldson | Feb. 7, 1939 |
| 2,389,413 | Carlton | Nov. 20, 1945 |

FOREIGN PATENTS

| Number | Country | Date |
|---|---|---|
| 140,340 | Austria | of 1935 |